(12) United States Patent
Haans et al.

(10) Patent No.: US 7,931,445 B2
(45) Date of Patent: Apr. 26, 2011

(54) APPARATUS AND METHOD FOR CLEANING AN ACTIVE FLOW CONTROL (AFC) SYSTEM OF A WIND TURBINE

(75) Inventors: Wouter Haans, Den Haag (NL); Jacob Johannes Nies, Zwolee (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/613,268

(22) Filed: Nov. 5, 2009

(65) Prior Publication Data

US 2010/0143123 A1 Jun. 10, 2010

(51) Int. Cl.
*F03D 7/00* (2006.01)
*F03D 11/00* (2006.01)
(52) U.S. Cl. ............... 416/231 R; 416/146 R; 416/1
(58) Field of Classification Search ............ 415/1, 115, 415/116, 145; 416/146 R, 231 R, 1
See application file for complete search history.

(56) References Cited

U.S. PATENT DOCUMENTS

| | | | |
|---|---|---|---|
| 4,692,095 A | 9/1987 | Lawson-Tancred | |
| 5,938,404 A | 8/1999 | Domzalski et al. | |
| 6,629,674 B1 | 10/2003 | Saddoughi et al. | |
| 6,940,185 B2 | 9/2005 | Andersen et al. | |
| 6,972,498 B2 | 12/2005 | Jamieson et al. | |
| 7,354,247 B2 * | 4/2008 | Bonnet | 416/90 R |
| 7,363,808 B2 | 4/2008 | Ormel et al. | |
| 7,387,491 B2 | 6/2008 | Saddoughi et al. | |
| 7,420,289 B2 | 9/2008 | Wang et al. | |
| 7,435,057 B2 * | 10/2008 | Parera | 416/231 R |
| 7,582,977 B1 | 9/2009 | Dehlsen | |
| 7,637,715 B2 | 12/2009 | Battisti | |
| 2001/0038798 A1 | 11/2001 | Foster | |
| 2005/0042102 A1 | 2/2005 | Teichert | |
| 2005/0242233 A1* | 11/2005 | Battisti | 244/58 |
| 2007/0231151 A1 | 10/2007 | Herr et al. | |
| 2009/0140862 A1 | 6/2009 | Eggleston | |
| 2009/0304505 A1* | 12/2009 | Wobben | 416/1 |

(Continued)

FOREIGN PATENT DOCUMENTS

| | | |
|---|---|---|
| EP | 1517033 A1 | 3/2005 |
| GB | 2186033 A | 8/1987 |
| GB | 2466433 A | 6/2010 |
| WO | 2004092577 A1 | 10/2004 |
| WO | 2008080407 A1 | 7/2008 |

OTHER PUBLICATIONS

David F. Fisher & Michael C. Fischer, Development Flight Tests of Jetstar LFC Leading-Edge Flight Test Experiment, (NASA, Langley Research Center ed., 1987).

(Continued)

*Primary Examiner* — Ninh H Nguyen
*Assistant Examiner* — Jesse Prager
(74) *Attorney, Agent, or Firm* — James McGinness, Esq.; Armstrong Teasdale LLP

(57) ABSTRACT

An active flow control (AFC) system for use with a wind turbine is provided. The wind turbine includes at least one rotor blade. The AFC system includes at least two manifolds at least partially defined within the at least one rotor blade, at least one aperture in flow communication with each manifold of the at least two manifolds, a gas supply coupled in flow communication with the at least two manifolds, and a valve system operatively coupled to the gas supply. The valve system is configured to block a gas flow to a first manifold of the at least two manifolds to redistribute the gas flow to a second manifold of the at least two manifolds.

20 Claims, 5 Drawing Sheets

U.S. PATENT DOCUMENTS

| | | | |
|---|---|---|---|
| 2009/0311097 A1* | 12/2009 | Pierce et al. | 416/42 |
| 2010/0076614 A1 | 3/2010 | Nies et al. | |
| 2010/0135790 A1 | 6/2010 | Pal et al. | |
| 2010/0135794 A1 | 6/2010 | Nies et al. | |
| 2010/0135795 A1 | 6/2010 | Nies et al. | |

OTHER PUBLICATIONS

Gustave P. Corten & Herman F. Veldkamp, "Insects Can Halve Wind-Turbine Power," 412 Nature, 42-43 (2001).

Albert L. Braslow, "A History of Suction-Type Laminar-Flow Control with Emphasis on Flight Research," Monographs in Aerospace History, No. 13, pp. 20, 21, 24 (1999).

Hal Romanowitz, "Alternate Energy Systems Engineering," available at www.oakcreekenergy.com/reports/flash/GCI-20020401.html (last visited Mar. 2, 2009).

Office Action dated Oct. 5, 2010, U.S. Appl. No. 12/613,170, 21 pages.

Office Action dated Aug. 19, 2010, U.S. Appl. No. 12/613,274, 17 pages.

* cited by examiner

APPARATUS AND METHOD FOR CLEANING AN ACTIVE FLOW CONTROL (AFC) SYSTEM OF A WIND TURBINE

CROSS-REFERENCE TO RELATED APPLICATIONS

Cross-reference is hereby made to related, commonly assigned, co-pending applications: U.S. Ser. No. 12/613,079 entitled "Method for Operating a Wind Turbine with Reduced Blade Fouling," U.S. Ser. No. 12/613,157 entitled "Active Flow Control System for Wind Turbine," U.S. Ser. No. 12/613,287 entitled "Systems and Methods for Assembling an Air Distribution System for Use in a Rotor Blade of a Wind Turbine," U.S. Ser. No. 12/613,013 entitled "Systems and Method for Operating a Wind Turbine Having Active Flow Control," U.S. Ser. No. 12/613,170 entitled "Systems and Method for Operating an Active Flow Control System," U.S. Ser. No. 12/613,274 entitled "Systems and Method for Operating a Wind Turbine Having Active Flow Control." Each cross-referenced application is invented by Jacob Johannes Nies and Wouter Haans and is filed on the same day as this application. Each cross-referenced application is hereby incorporated by reference in its entirety.

BACKGROUND OF THE INVENTION

The present disclosure relates to wind turbines. Particularly, the present disclosure relates to a wind turbine rotor blade and a wind turbine including such a wind turbine rotor blade.

Although horizontal axis wind turbines are well-established these days, there is still considerable engineering effort going on to further improve their overall efficiency, robustness, and power generating capability.

This research has lead to the most recent active flow control (AFC) technologies which aim to improve wind turbine efficiency. AFC technologies try to avoid flow separation over rotor blades by actively modifying the wind flow proximate to the rotor blade. This can be achieved by ejecting gas through apertures formed in the surface of the rotor blade.

The introduction of such AFC systems has brought about the fact that the apertures used for blowing gas eventually collect dirt or impurities. This phenomenon is one aspect of the so-called blade fouling. Blade fouling can substantially lower the performance, in particular the extracted power of wind turbines.

BRIEF DESCRIPTION OF THE INVENTION

In one aspect, an active flow control (AFC) system for use with a wind turbine is provided. The wind turbine includes at least one rotor blade. The AFC system includes at least two manifolds at least partially defined within the at least one rotor blade, at least one aperture in flow communication with each manifold of the at least two manifolds, a gas supply coupled in flow communication with the at least two manifolds, and a valve system operatively coupled to the gas supply. The valve system is configured to block a gas flow to a first manifold of the at least two manifolds to redistribute the gas flow to a second manifold of the at least two manifolds.

In another aspect, a wind turbine in provided. The wind turbine includes at least one rotor blade, and an active flow control (AFC) system. The AFC system includes at least two manifolds at least partially defined within the at least one rotor blade, at least one aperture in flow communication with each manifold of the at least two manifolds, a gas supply coupled in flow communication with the at least two manifolds, and at least one valve operatively coupled to the gas supply. The at least one valve is configured to block a gas flow to a first manifold of the at least two manifolds to redistribute the gas flow to a second manifold of the at least two manifolds.

In yet another aspect, a method for cleaning at least one manifold is provided. The at least one manifold is at least partially defined within at least one rotor blade of a wind turbine having an active flow control (AFC) system. A gas supply is in flow communication with the at least one manifold. The method includes operating the AFC system in a first mode, determining whether the at least one manifold is to be cleaned, and operating the AFC system in a second mode different than the first mode. A gas flow rate through the at least one manifold during the second mode is higher than a gas flow rate through the at least one manifold during the first mode.

Further aspects, advantages and features of the embodiments described herein are apparent from the dependent claims, the description, and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Modern wind turbines are designed to produce a maximum amount of energy in a particular geographical area. However, if the wind speed becomes too large and therefore changes an angle of attack above a certain value, flow separation over wind turbine rotor blades occurs and results in stall. In such a situation, energy production by the wind turbine is reduced or even prevented. By delaying the flow separation over the rotor blades, the design of the wind turbine can be favorably changed, e.g. to increase an operational wind speed range and/or to change design parameters, such as chord. This will eventually result in a considerable decrease of wind turbine cost.

Flow separation over wind turbine rotor blades can be delayed by blowing gas out of small apertures arranged at a surface of a rotor blade. The gas may be supplied to the apertures through manifolds at least partially defined within the rotor blade by a gas supply. Various gases may be used, such as, but not limited to, air, nitrogen, and/or carbon dioxide. When the term "air" is used in the following description, this is done without any intention to limit the scope of the appended claims. The gas flow rate through the manifolds and out of the apertures is controlled by the gas supply. Controlling the gas flow rate results in delayed flow separation, which changes the aerodynamic properties of the rotor blade. The system described herein, which includes a gas supply, manifolds, and apertures, actively controls the gas flow out of the apertures of the rotor blade. Such system is referred to as an active flow control (AFC) system.

Figure 1:
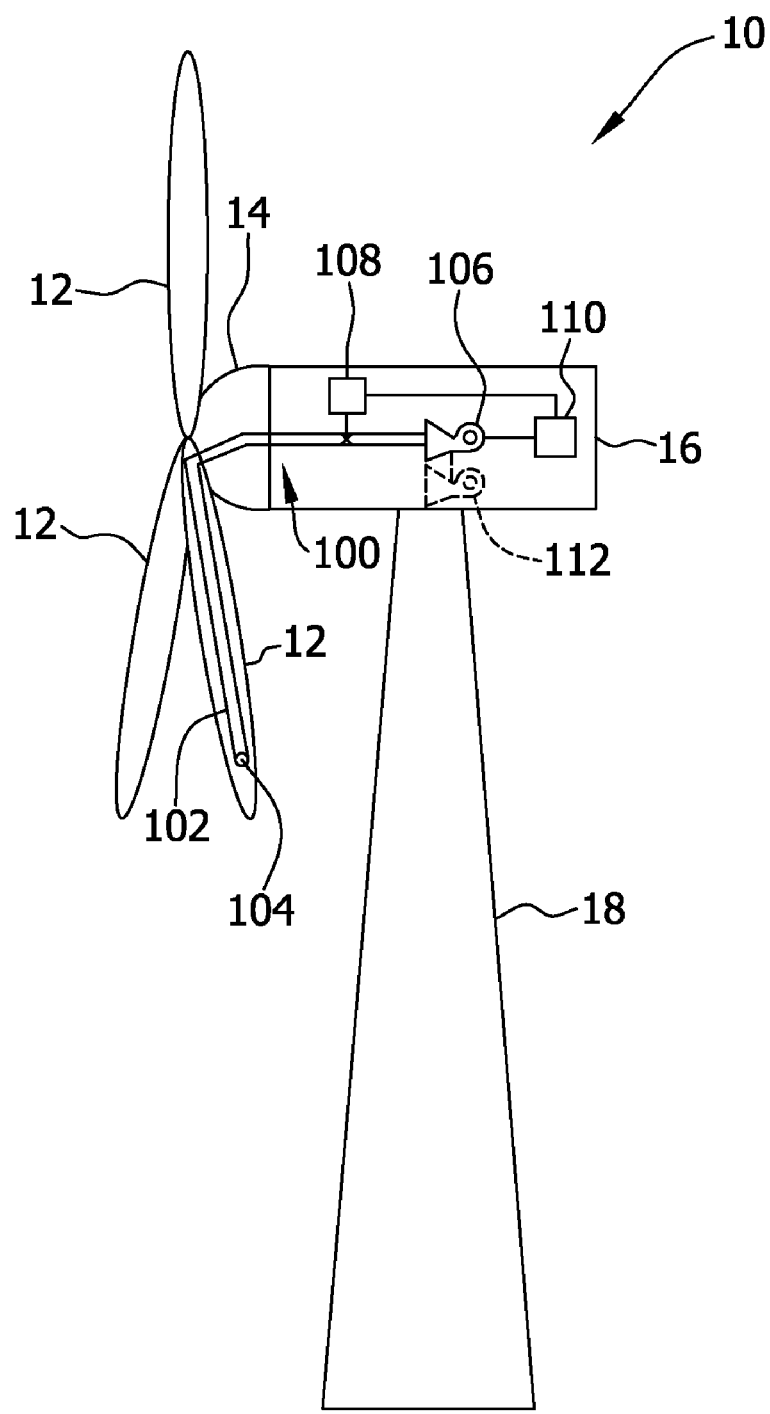
FIG. 1 is a schematic side view of an exemplary wind turbine.
Figure 2:
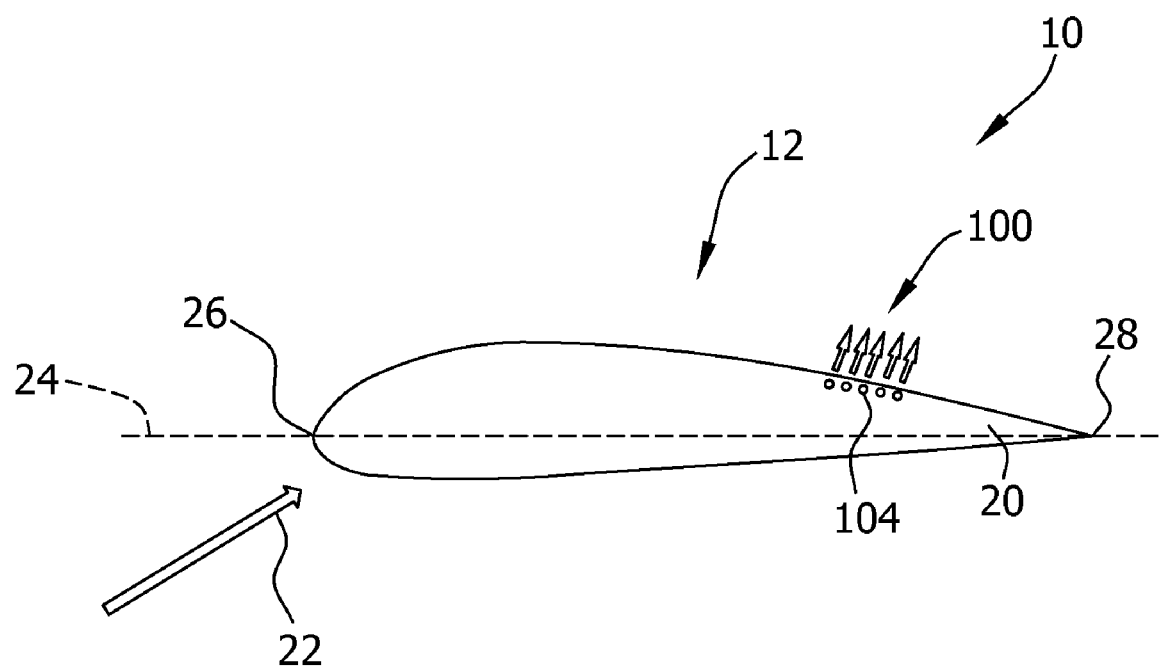
FIG. 2 is a schematic chord-wise cross sectional view of an exemplary rotor blade that may be used with the wind turbine shown in FIG. 1.
Figure 3:
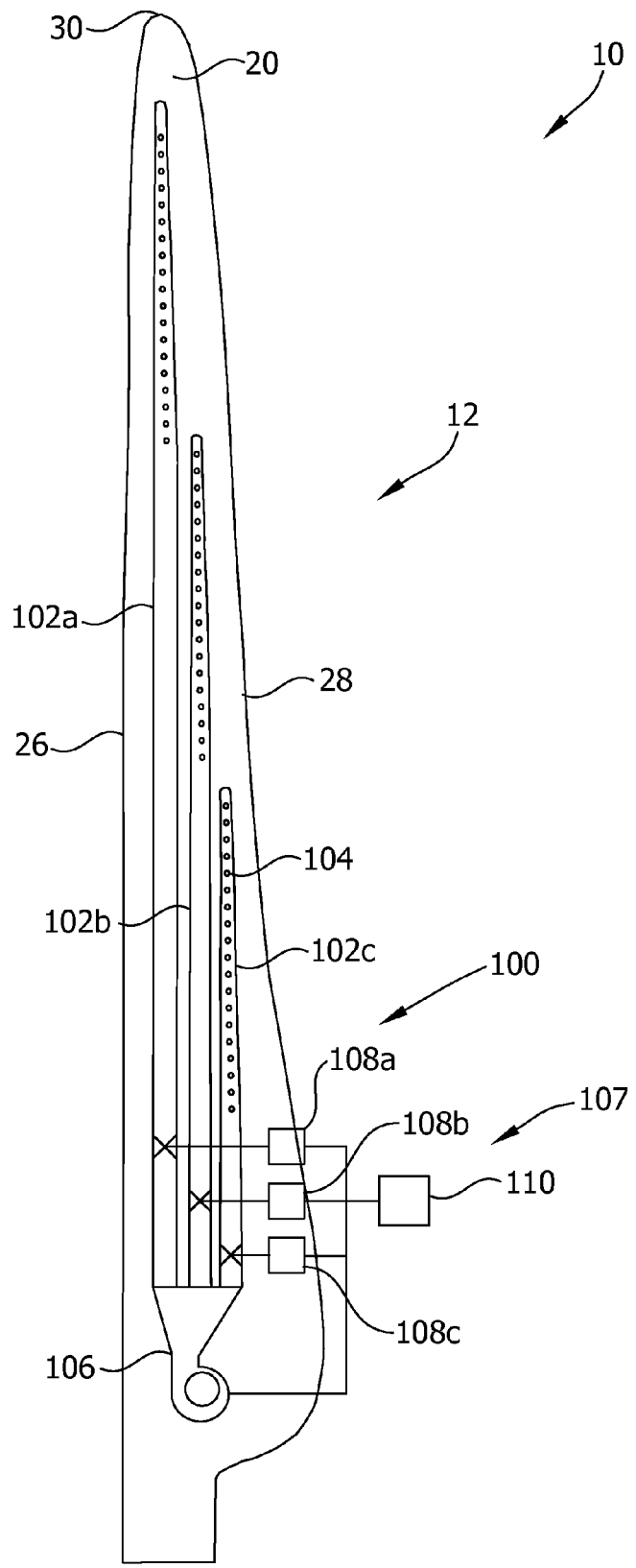
FIG. 3 is a schematic longitudinal cross sectional view of the rotor blade shown in FIG. 2.

FIG. 1 shows an exemplary wind turbine 10. FIG. 2 is a chord-wise cross-sectional view of a rotor blade 12 being equipped with an AFC system 100. FIG. 3 shows a longitudinal cross sectional view of rotor blade 12. Wind turbine 10 includes three rotor blades 12. Rotor blades 12 are mounted on a rotor hub 14 which is connected to a nacelle 16 that is fixed on a top of a tower 18. Generally, wind turbine 10 includes at least one rotor blade 12, and typically three rotor blades 12. However, wind turbine 10 can include any suitable number of rotor blades 12. In the exemplary embodiment, at least one rotor blade 12 has the configuration shown in FIG. 3, however, any other rotor blade include a configuration different than the configuration shown in FIG. 3.

Referring to FIG. 1, in the exemplary embodiment, each rotor blade 12 includes at least one manifold 102 being connected to an aperture 104 defined through a surface 20 of rotor blade 12. For reasons of simplicity, only one rotor blade 12 having one manifold 102 and one aperture 104 is depicted in FIG. 2. Referring again to FIG. 1, at an opposite end of manifold 102, each manifold 102 included is connected to a single gas supply 106 that supplies gas to manifolds 102 of rotor blades 12.

Gas supply 106 can include, without limitation, a pump, a pressure tank, a compressed gas cylinder, a compressor, a fan, a pumping device, and/or a blower. Typically, gas supplied to manifolds 102 is air, nitrogen, and/or carbon dioxide. In the exemplary embodiment, gas supply 106 is positioned within nacelle 16, however, gas supply 106 can be positioned at any suitable location within or outside of wind turbine 10. Manifolds 102 are configured to transport gas between gas supply 106 and apertures 104. Although, in the exemplary embodiment, wind turbine 10 is described has having one gas supply 106, it should be understood that wind turbine 10 may include a plurality of gas supplies 106, 112, such as, for example, a first gas supply 112 for performing an AFC operation and a second, separate gas supply 106 for performing a cleaning operation.

Referring to FIGS. 1-3, at least one rotor blade 12 includes at least two manifolds 102. More specifically, in the exemplary embodiment, each rotor blade 12 includes a plurality of manifolds 102a, 102b, and 102c and a plurality of apertures 104. Each manifold 102a, 102b, and 102c included inside a rotor blade 12 may be connected to one aperture 104 or a plurality of apertures 104. In the exemplary embodiment, each manifold 102a, 102b, and 102c is in flow communication with a respective set of apertures 104, wherein each set of apertures 104 extends along a respective portion of a length of rotor blade 12. Apertures 104 may be, but are not limited to being, holes, slots, and/or sponge-type openings. Typically the shape of apertures 104 is round, but different shapes, like longish, oval, and/or rectangular shapes are also conceivable. Furthermore, size or diameters of apertures 104 may also vary.

Further, wind turbine 10 includes a valve system 107 having at least one valve 108 coupled in flow communication between gas supply 106 and at least one manifold 102. In the exemplary embodiment, valve system 107 and/or valve 108 is arranged inside nacelle 16, however, it should be understood that valve system 107 and/or valve 108 can be at any suitable location within wind turbine 10, such as rotor blade 12 and/or rotor hub 14. In a particular embodiment, each manifold 102 is connected to a valve 108, and each valve 108 is configured to block a gas flow to a respective manifold 102. Furthermore, in some embodiments, each manifold 102 and/or each manifold 102a, 102b, and/or 102c is connected to an individual valve 108. Alternatively, two or more manifolds 102 and/or manifolds 102a, 102b, and/or 102c are connected to one valve 108. In some embodiments, a single valve 108 is provided for each rotor blade 12. In the exemplary embodiment, rotor blade 12 includes manifolds 102a, 102b, and 102c (shown in FIG. 3), each of which may be blocked individually by corresponding valves 108a, 108b, and 108c, respectively. In such an embodiment, valve system 107 includes valves 108a, 108b, and 108c.

Referring to FIG. 2, rotor blade 12 is seen along a span-wise axis of rotor blade 12. In typical situations, a wind direction 22 impinges rotor blade 12 at an area slightly above where a chord line 24 intersects rotor blade 12 at a leading edge 26. Apertures 104 are typically positioned on a suction side of rotor blade 12 downwind of an airfoil maximum thickness. More specifically, the position of apertures 104 is typically on the suction side of rotor blade 12 near a trailing edge 28. The aerodynamic properties of rotor blade 12 are changed by gas being ejected through apertures 104. More specifically, each manifold 102a, 102b, and 102c is connected to apertures 104 being a part of manifolds 102a, 102b, and 102c on surface 20 of rotor blade 12. The gas flow out of apertures 104 at an end of rotor blade 12 leads to an improved flow separation of rotor blade 12, which changes the aerodynamic properties of rotor blade 12.

Rotor blade 12 has leading edge 26 on a left hand side of FIG. 3 and trailing edge 28 on a right hand side of FIG. 3. Manifold 102a closest to leading edge 26 is the longest manifold and extends almost until a tip 30 of rotor blade 12. Manifold 102c extends to about half of a longitudinal length of rotor blade 12. A tip of manifold 102c is close to trailing edge 28 of rotor blade 12. A length of middle manifold 102b roughly equals an arithmetic average of outer manifolds 102a and 102c. Such specific properties of rotor blade 12 are only exemplary. Typically, a number of manifolds 102 and/or a number of apertures 104 may be different from the example shown in FIG. 3. Further, lengths and/or widths of manifolds 102a, 102b, and/or 102c and/or position of manifolds 10a, 102b, and/or 102c within rotor blade 12 may also vary from those shown in FIG. 3.

Further, manifold 102a is in flow communication with a first set of apertures 104 located length-wise nearest tip 30 of rotor blade 12, manifold 102c is in flow communication with a second set of apertures 104 located length-wise nearest a root of rotor blade 12, and manifold 102b is in flow communication with a third set of apertures 104 located length-wise between the first set of apertures 104 and the second set of apertures 104.

In the exemplary embodiment, wind turbine 10 further includes AFC system 100, which includes gas supply 106, apertures 104, and manifolds 102. AFC system 100 further includes an AFC controller 110 that controls valves 108 and a flow rate of gas supply 106. By controlling a respective valve 108 and/or the gas rate of gas supply 106, the gas flow rate within each manifold 102 and/or 102a, 102b, and/or 102c can be controlled. AFC controller 110 also switches AFC system 100 between an AFC mode and a cleaning mode, as described in more detail below. AFC controller 110 can be combined with or separate from a wind turbine controller.

In a particular embodiment, AFC controller 110 controls the gas flow rate through manifolds 102a, 102b, and/or 102c by changing the gas flow rate of gas supply 106. Alternatively or additionally, AFC controller 110 controls the gas flow rate through manifolds 102a, 102b, and/or 102c by blocking, e.g. manifold 102a, thereby increasing the gas flow rate through unblocked manifolds 102b and 102c. As apertures 104 are connected to manifolds 102a, 102b, and 102c, the gas flow rate through apertures 104 can be controlled by the gas flow rate through manifolds 102a, 102b, and 102c. According to both embodiments described above, AFC controller 110 can delay the flow separation over rotor blades 12, which changes the aerodynamic properties of rotor blade 12.

More specifically, AFC controller 110 is configured to switch AFC system 100 between an AFC mode, a cleaning mode, and a safe mode. In at least some embodiments, the wind turbine controller is configured to switch off AFC system 180. When the wind turbine controller can switch off AFC system 100, AFC controller is configured to switch AFC system 100 between the AFC mode and the cleaning mode. In the exemplary embodiment, gas supply 106 is connected to the same manifolds 102 in the AFC mode and the cleaning mode. Alternatively, gas supply 106 supplying gas to at least one manifold 102 in the AFC mode is connected to at least one different manifold 102 in the cleaning mode.

In the AFC mode, gas is blown through manifolds 102 and apertures 104 of rotor blades 12 for improving the aerodynamic properties of each rotor blade 12. Wind turbine 10 may be operated with AFC system 100 switched on or off When the AFC system 100 is switched off, wind turbine 10 is running in what is referred to as a "safe mode." When AFC system 100 is switched on, in the AFC mode or in the cleaning mode, ejection of air or gas out of apertures 104 may cause aerodynamic imbalance of the rotor. If no air is ejected out of apertures 104, the aerodynamic imbalance of the rotor is typically reduced. This is why the mode in which AFC system 100 is switched off is called the safe mode. In principle, each technical imperfection may lead to imbalance of some part of wind turbine 10 in some magnitude. Such imbalance may originate from mass distribution deviations, aerodynamic deviations, wind turbulence, and so forth. Causes for imbalance of AFC system 100 may be unequal air streams due to technical imperfections, differences in fouling, and/or cleaning actions in process.

When AFC system 100 is switched on or off, impurities and/or dirt typically accumulates on inner walls of manifolds 102a, 102b, and/or 102c. Depending on the impurities, it takes a definite amount of force to detach the impurities from the inner walls of manifolds 102a, 102b, and/or 102c. For example, when the gas flow rate is increased beyond a definite amount where the force exerted by the gas particles is larger than the adhesive force between the impurity particles and the inner wall of manifolds 102, the impurities will be torn off the inner walls of manifolds 102a, 102b, and/or 102c and will be swept through apertures 104, thus leaving rotor blade 12 clean. If the increased gas flow rate is kept constant over some period of time, manifolds 102a, 102b, and/or 102c of the rotor blade 12 will be cleaned of impurities and/or debris.

In the cleaning mode, the gas flow rate within manifolds 102 is larger than a gas flow rate in the AFC mode. This increased gas flow rate is determined so that the gas flow drags the impurity particles away from the inner walls of manifolds 102 and flushes them through apertures 104 out of manifolds 102, giving rise to a cleaning action inside manifolds 102. This may be done for a single or each manifold 102 and/or manifold 102a, 102b, and/or 102c, simultaneously or consecutively.

In the exemplary embodiment, the gas flow rate is varied using valves 108, as described in more detail below. More specifically, if one valve 108 is blocked by AFC controller 110, the blocked gas flow is redistributed to unblocked manifolds 102 and/or manifolds 102a, 102b, and/or 102c, thus increasing the gas flow rate in the unblocked manifolds while decreasing the gas flow rate in a blocked manifold. The increased gas flow rate can be used to clean each manifold 102.

The gas flow emerging from gas supply 106 into each of manifolds 102a, 102b, and/or 102c may be blocked by valves 108a, 108b, and 108c arranged at or in an onset of manifolds 102a, 102b, and/or 102c after junctions of gas supply 106 and manifolds 102a, 102b, and/or 102c. To clean manifolds 102a, 102b, and/or 102c in the exemplary embodiment, valve 108a is blocked and the gas flow is redistributed to unblocked manifolds 102b and 102c, thus increasing the gas flow through unblocked manifolds 102b and 102c as compared to the case where none of manifolds 102a, 102b, and 102c is blocked. The increased gas flow is used for cleaning unblocked manifolds 102b and 102c. Each valve 108a, 108b, and 108c may be continuously adjusted from completely open to completely closed. It is to be understood that the term "blocking" does not necessarily mean complete blocking, but may also imply partial blocking of manifolds 102a, 102b, and/or 102c. As such, valves 108a, 108b, and 108c may have a flow control function. If valve 108a is not closed completely, the gas flow through other valves 108b and 108c is not increased to the same extent as compared to the case in which valve 108a closes completely. If it is intended to clean manifolds 102b and 102c, the gas flow through manifolds 102b and 102c needs to be large enough to ensure a cleaning action within manifolds 102b and 102c. If the gas flow through manifolds 102b and 102c is not large enough to remove particles from manifolds 102b and/or 102c, the gas flow rate of gas supply 106 can be increased and/or valve 108a can be closed more completely. In both events, the gas flow through manifolds 102b and 102c can be increased beyond a value where the cleaning action is large enough to clean manifolds 102b and 102c. In alternative embodiments, valves 108a, 108b, and/or 108c can be replaced by other flow control devices which are configured to control gas flows through manifolds 102a, 102b, and/or 102c.

Figure 4:
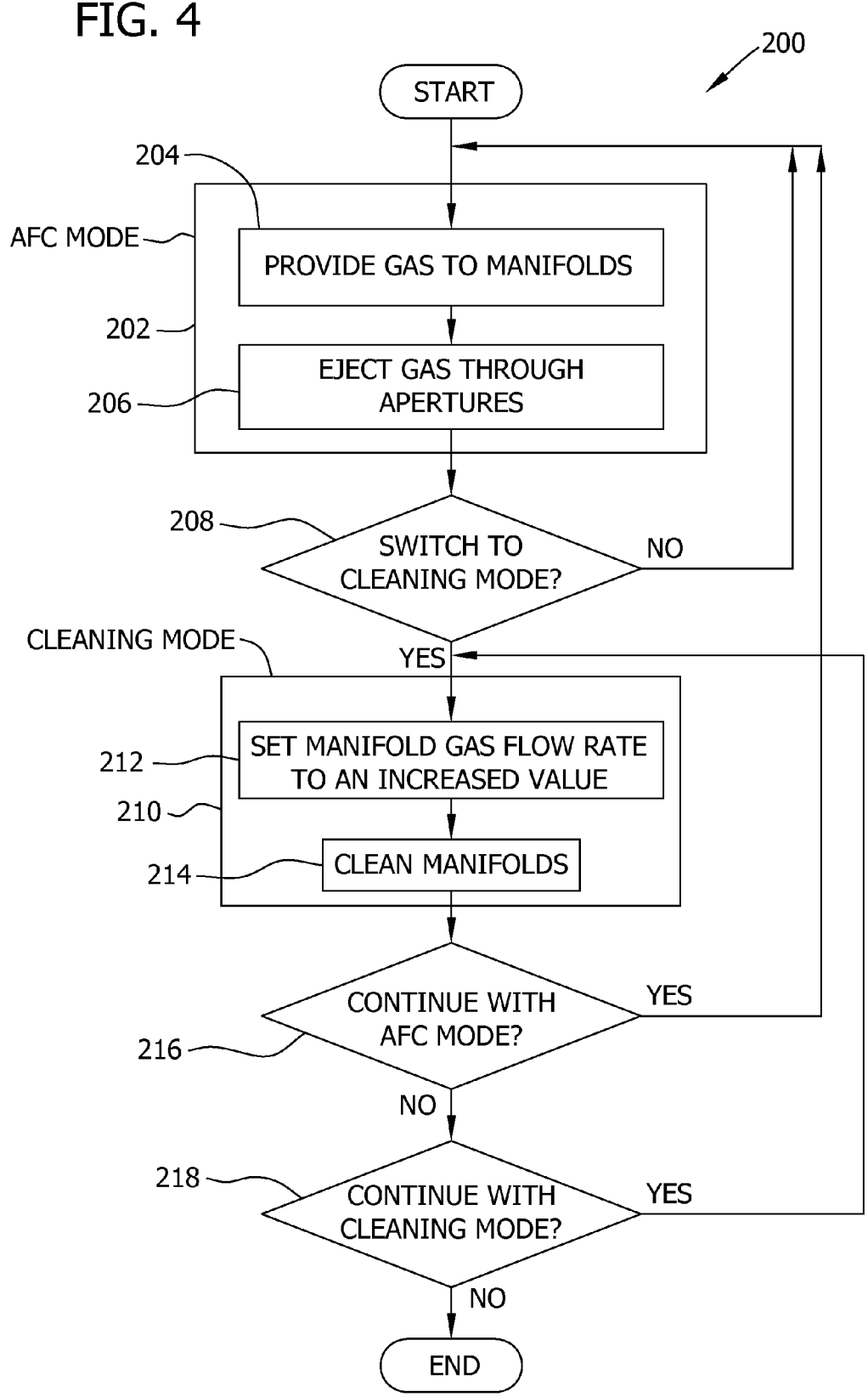
FIG. 4 is a flowchart of an exemplary method for cleaning the rotor blade shown in FIGS. 2 and 3.

FIG. 4 illustrates a method 200 for cleaning manifolds 102 of rotor blade 12 having AFC system 100. In the exemplary embodiment, the AFC system 100 is operated 202 in a first mode, or an AFC mode, which is used to improve the aerodynamic properties of rotor blades 12. The AFC mode is realized by providing 204 gas to manifolds 102 and then ejecting 206 gas through apertures 104. While the AFC mode is operating 202, gas is continuously being ejected 206 out of apertures 104.

In step 208, it is decided whether AFC system 100 switches from the first mode to a second mode, or a cleaning mode. This decision can be taken automatically, e.g. by a computer, or by a human user. If the answer is NO, AFC system 100 remains in the AFC mode. If the answer is YES, AFC system 100 switches to operate 210 in a second mode, or the cleaning mode. In a first step 212 of the cleaning mode, the gas flow rate through manifolds 102 is set to an increased gas flow rate using valve system 107 and/or valves 108 and/or varying a gas flow of gas supply 106, as described above. In the next step 214 of the cleaning mode, manifolds 102 are cleaned by applying the cleaning action of the increased gas flow rate to manifolds 102.

After cleaning the manifolds 102 for some time, one may either choose 216 to continue operate 202 in the AFC mode or choose 218 to operate 210 in the cleaning mode. If it is chosen to continue with the AFC mode, AFC system 100 returns to operating 202 in the AFC mode, returning to the top of the flow diagram of the method shown in FIG. 4. In case it is chosen to continue with the cleaning mode, AFC system 100 remains operating 210 in the cleaning mode. In case none of those possibilities is wanted, it may be selected to end method 200, thus shutting down wind turbine 10 and/or to switch AFC system 100 to the safe mode.

Figure 5:
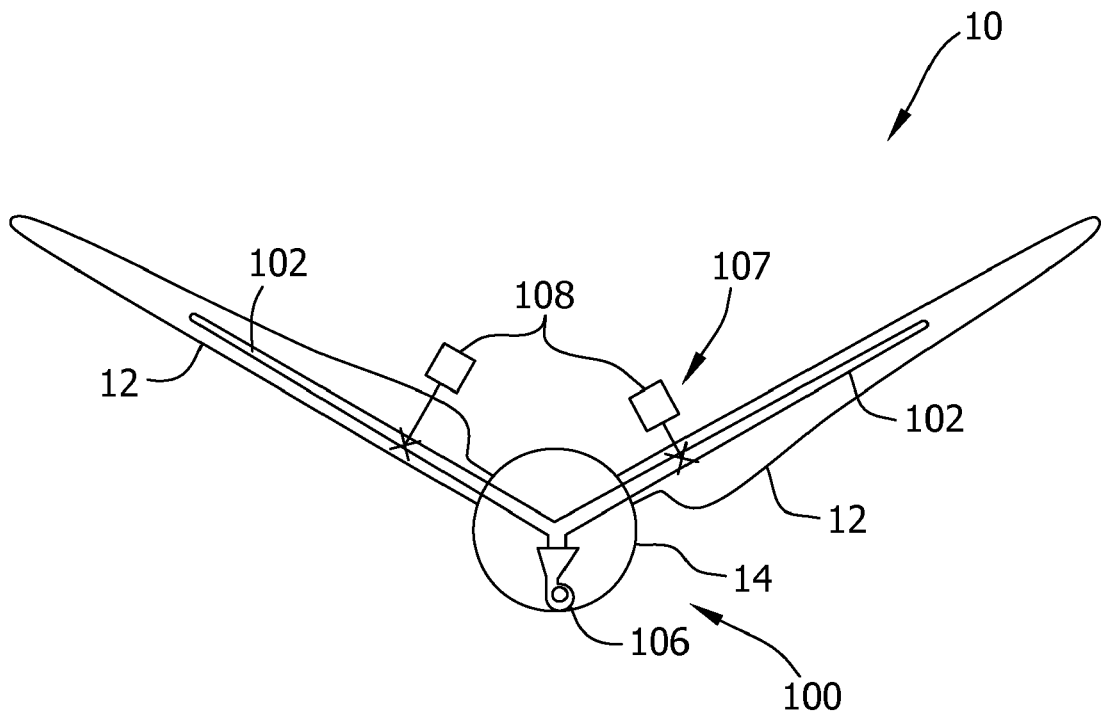
FIG. 5 shows a schematic drawing illustrating part of a wind turbine according to embodiments described herein.

Referring to FIGS. 3 and 4, method 200 is executed with rotor blade 12 having a plurality of manifolds 102a, 102b, and/or 102c. Although method 200 is described as being used when manifolds 102a, 102b, and/or 102c are within the same rotor blade 12, method 200 may be used with at least two manifolds 102 that are positioned within at least two rotor blades 12 when the at least two manifolds 102 are coupled in flow communication with the same gas supply 106, as shown in FIG. 5. Further, although manifold 102a is described as being blocked, manifold 102b and/or manifold 102c may additionally or alternatively be fully or partially blocked. In the exemplary embodiment, a gas flow from gas supply 106 to at least one manifold 102a is blocked such that the blocked gas flow is redistributed to remaining unblocked manifolds 102b and 102c, thus increasing the gas flow in unblocked manifolds 102b and 102c. Valve 108a is used for blocking manifold 102a. In the exemplary embodiment, AFC controller 110 is used to control valves 108a, 108b, and/or 108c and the gas flow through manifolds 102a, 102b, and/or 102c.

Because the gas flow through manifolds 102 is restricted to unblocked manifolds 102b and 102c, the gas flow rate in manifolds 102b and 102c is increased. As explained above, this gives rise to an increased cleaning action as the increased air flow drags the impurity particles away from the inner walls of manifolds 102b and 102c and apertures 104 and flushes them out of manifolds 102b and 102c. Alternatively, the gas flow rate may be increased by increasing a gas flow rate of gas supply 106 supplying gas to manifolds 102a, 102b, and/or 102c. If the gas flow rate of gas supply 106 supplying gas to each of manifolds 102a, 102b, and/or 102c is increased, the gas flow rate in each of manifolds 102a, 102b, and/or 102c is also increased.

FIG. 5 shows an alternative embodiment of wind turbine 10. As shown in FIG. 5, each rotor blade 12 includes at least one manifold 102 and gas supply 106 is coupled in flow communication with at least two manifolds 102 located in at least two rotor blades 12. More specifically, gas supply 106 is connected to manifolds 102 which are arranged in different rotor blades 12. Although wind turbine 10 includes three rotor blades 12, for clarity reasons FIG. 5 shows only two rotor blades 12 and further relevant parts of wind turbine 10. In the exemplary embodiment, two rotor blades 12 are illustrated and each rotor blade 12 includes at least one manifold 102. Each manifold 102 may be blocked by a valve 108. Valves 108 are depicted outside rotor blade 12 for clarity reason, however, valves 108 are typically arranged inside rotor blade 12, inside rotor hub 14, and/or inside nacelle 16.

Additionally or alternatively, each rotor blade 12 may also include a plurality of manifolds 102a, 102b, and/or 102c and a plurality of apertures 104. What has been said about the embodiment of FIG. 3, particularly about manifolds 102a, 102b, and 102c and apertures 104 also applies to the embodiment shown in FIG. 5.

Further, in the embodiment shown in FIG. 5, rotor blades 12 are both mounted to rotor hub 14 in which both manifolds 102 also join. Gas supply 106 is arranged inside rotor hub 14 in fluid communication with manifolds 102. In particular, gas supply 106 may be connected to a junction of manifolds 102 to supply gas to manifolds 102. Alternatively, gas supply 106 may also be arranged inside rotor blade 12, inside tower 18, and/or or inside nacelle 16 adjacent rotor hub 14.

Figure 6:
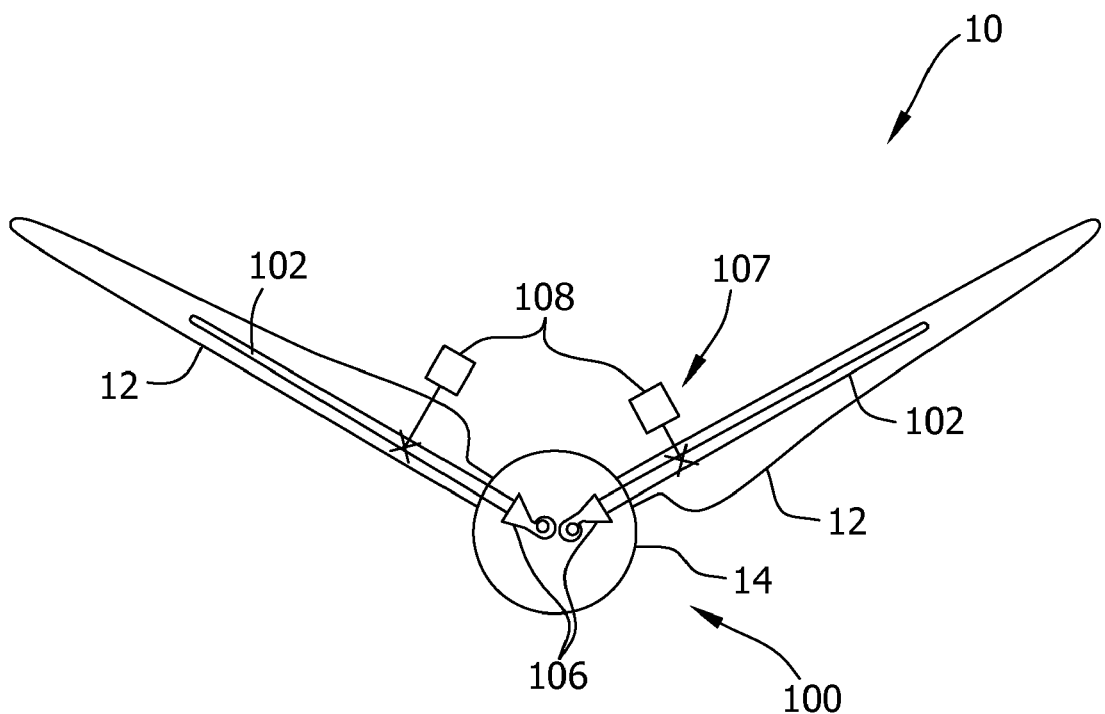
FIG. 6 shows a schematic drawing illustrating part of a wind turbine according to further embodiments described herein.

FIG. 6 shows an alternative embodiment of wind turbine 10. More specifically, in FIG. 6, wind turbine 10 includes one gas supply 106 for each rotor blade 12. Wind turbine 10 includes three rotor blades 12, however, for clarity reasons, FIG. 6 shows only two rotor blades 12 and further relevant parts of wind turbine 10. In the exemplary embodiment, two gas supplies 106 separately supply gas to manifolds 102 of rotor blades 12. More specifically, each gas supply 106 is connected to a different manifold 102 and supplies gas to that manifold 102. Manifolds 102 may be in the same rotor blade 12 or in different rotor blades 12. Gas supplies 106 are arranged inside rotor hub 14. Additionally or alternatively, gas supplies 106, or only single gas supplies 106, is arranged inside rotor blade 12, inside tower 18, and/or inside nacelle 16 adjacent rotor hub 14.

According to further embodiments, each rotor blade 12 may also include a plurality of manifolds 102 and a plurality of apertures 104, as shown and described with respect to FIG. 3. What has been said about manifolds 102 and apertures 104 with respect to FIG. 3 also applies to the embodiment shown in FIG. 6.

According to the embodiment of FIG. 6, the gas flow rate in manifolds 102 be controlled and/or blocked by corresponding valves 108. Such valves 108 may be arranged such that one valve 108 blocks manifolds 102 included in a complete blade 12 or such that each manifold 102 may blocked by a different valve 108. Alternatively, the gas flow to each manifold 102 of a plurality of manifolds 102 included in each rotor blades 12 may be blocked individually.

In further alternative embodiments, when wind turbine 10 includes a plurality of gas supplies 106, 112, each gas supply 106, 112 may supply gas to a single manifold 102 or a plurality of manifolds 102. For example, a single gas supply 106 or a plurality of gas supplies 106 may be used as primary cleaning gas supplies 106 while the remaining gas supplies 112 are only used in the AFC mode. Hereby the manifolds 102 of each rotor blade 12 may be cleaned simultaneously or consecutively. If different rotor blades 12 are used in different modes, e.g. in the AFC mode or the cleaning mode, wind turbine 10 has to be operated at a different operating point to compensate for the change in aerodynamic properties and eventually also for arising aerodynamic imbalance. In case there is a plurality of gas supplies 106, 112 supplying gas to manifolds 102, if the gas flow rate of each gas supply 106, 112 is increased, the gas flow rate in each manifold 102 is subsequently increased.

In case the manifolds 102 are cleaned consecutively, the gas flow of the gas supplies 106, 112 may be connected to the corresponding manifold 102 by switchable valves 108. In order to further increase the gas flow rate through a manifold 102 to be cleaned, one or more additional gas supplies 112 may be connected in series to the gas supply 106 which cleans the manifold 102. The additional gas supplies 112 may be spare gas supplies or gas supplies which are part of wind turbine 10 but not used all of the time.

In a particular embodiment in which wind turbine 10 includes at least two gas supplies 106, 112, one supply 106 has a larger gas flow rate than the remaining gas supply 112. Gas supply 106 having the larger gas flow rate serves as a primary cleaning gas supply. When at least one manifold 102 is to be cleaned, primary cleaning gas supply 106 is connected to each manifold 102 for cleaning thereof. Cleaning may be done simultaneously or consecutively.

When manifolds 102 are cleaned consecutively, the gas flow of primary cleaning gas supply 106 is first connected to a single manifold 102 to be cleaned by at least one switchable valve 108 and then cleaned by blowing gas through manifold 102. After cleaning manifold 102, primary cleaning gas supply 106 is connected to a different single manifold 102 to be cleaned which is then cleaned by blowing gas through it. This procedure is repeated until each manifold 102 is cleaned. When each manifold 102 is cleaned simultaneously, primary cleaning gas supply 106 is connected to each manifold 102 simultaneously and then gas is blown simultaneously through each manifold 102 using primary cleaning gas supply 106.

When using more than one gas supply 106, 112, the gas flow rate of at least one gas supply 106 can be increased by connecting a further gas supply 112 in series to that gas supply 106. The further gas supply 112 may either be an additional gas supply or a gas supply which is used somewhere inside wind turbine 10 but not needed to perform another operation at that moment of time.

In an alternative embodiment in which wind turbine 10 includes at least one gas supply 106, gas supply 106 is used mainly or only as a primary cleaning gas supply. In contrast to the embodiments including two or more gas supplies 106, 112, this embodiment has at least one gas supply 106 which is mainly or only used for cleaning manifolds 102 of rotor blades 12. During the AFC mode, gas supply 106 is not used at all or only in rare cases. In the cleaning mode, a gas supply used in the AFC mode is not used at all, while gas supply 106 is used for cleaning manifolds 102. In the above-described single gas supply 106 embodiment, the gas flow rate of gas supply 106 which is to be used as a primary cleaning gas supply may be increased by connecting a further gas supply 112 in series to gas supply 106.

According to a still further alternative embodiment, wind turbine 10 includes at least one gas supply 106 having a non-zero gas flow rate at or close to zero delivery. This is done to prevent manifolds 102 which are not used in the AFC mode or in the cleaning mode from collecting impurities on the inner walls of manifolds 102. Manifolds 102 which are not used at a special point of time will start to foul. This may be the case if definite apertures 104 are not used in some type of AFC mode or cleaning mode. In that case, a non-zero gas flow is constantly supplied to manifold 102 not in use to clean the inner walls of that manifold 102 in order to not let manifold 102 foul. This is typically done for all manifolds 102 which are not in use at a special point of time.

When more than one rotor blade 12 is being cleaned simultaneously, a gas flow through at least one manifold 102 in each rotor blade 12 is concentrated on the same span-wise section of each rotor blade 12. Thus an aerodynamic imbalance can be prevented or at least be reduced. It is also possible to concentrate the flow on different span-wise sections of each rotor blade 12. However, it should be noted here that in this case wind turbine 10 typically has to be operated at a different operating point to compensate for the change in aerodynamic properties and eventually also for arising aerodynamic imbalance. In such a case, wind turbine 10 is typically operated at a lower angular rotor speed.

In any of the above-described embodiments, different rotor blades 12 of wind turbine 10 may be operated in either the AFC mode or the cleaning mode. However, if different rotor blades 12 are operated in different modes, wind turbine 10 is typically operated at a different operating point in which the load of rotor blades 12 is reduced because of the increased aerodynamic imbalance in that operating mode. Alternatively, wind turbine 10 is operated in a different operating mode to compensate for the aerodynamic unbalance of a wind turbine rotor while asymmetric AFC is applied to at least one rotor blade 12 of wind turbine 10, which has more than one rotor blade 12. More specifically, wind turbine 10 runs in an asymmetric AFC mode if the forces and moments on the rotor caused by changes in the aerodynamic properties due to the gas flow out of apertures 104 of each rotor blade 12 are different for each rotor blade 12.

A technical effect of the systems and method described herein includes at least one of: (a) operating an AFC system in a first mode; (b) determining whether at least one manifold is to be cleaned; and (c) operating an AFC system in a second mode different than the first mode, wherein a gas flow rate through at least one manifold during the second mode is higher than a gas flow rate through the at least one manifold during the first mode.

This written description uses examples, including the best mode, to enable any person skilled in the art to make and use the described subject-matter. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope is defined by the claims, and may include such modifications and other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An active flow control (AFC) system for use with a wind turbine that includes at least one rotor blade, said AFC system comprising:
    at least two manifolds at least partially defined within the at least one rotor blade;
    at least one aperture in flow communication with each manifold of said at least two manifolds;
    a gas supply coupled in flow communication with said at least two manifolds;
    an AFC controller operatively coupled to said gas supply and configured to determine that at least one manifold of said at least two manifolds is fouled; and
    a valve system coupled in communication with said AFC controller and operatively coupled to said gas supply, said valve system configured to block a gas flow to a first manifold of said at least two manifolds to redistribute the gas flow to a second manifold of said at least two manifolds upon the determination that the at least one manifold of said at least two manifolds is fouled.

2. The AFC system according to claim 1, wherein said valve system comprises a first valve and a second valve, the first valve operatively coupled to the first manifold and the second valve operatively coupled to the second manifold.

3. The AFC system according to claim 1, wherein said at least two manifolds are defined within one rotor blade.

4. The AFC system according to claim 1, wherein said gas supply comprises at least one of a pump, a pressure tank, a compressed gas cylinder, a compressor, a fan, a pumping device, and a blower.

5. The AFC system according to claim 1, wherein said AFC controller is further configured to control a flow rate of gas supplied from said gas supply to at least one of said at least two manifolds.

6. The AFC system according to claim 1, further comprising a second gas supply, the first manifold coupled in flow communication with the first gas supply and the second manifold coupled in flow communication with the second gas supply.

7. The AFC system according to claim 1, wherein the at least one rotor blade comprises a first rotor blade and a second rotor blade, the first manifold defined in the first rotor blade and the second manifold defined in the second rotor blade.

8. A wind turbine comprising:
at least one rotor blade; and
an active flow control (AFC) system comprising:
   at least two manifolds at least partially defined within said at least one rotor blade;
   at least one aperture in flow communication with each manifold of said at least two manifolds;
   a gas supply coupled in flow communication with said at least two manifolds;
   an AFC controller operatively coupled to said gas supply and configured to determine that at least one manifold of said at least two manifolds is fouled; and
   at least one valve coupled in communication with said AFC controller and operatively coupled to said gas supply, said at least one valve configured to block a gas flow to a first manifold of said at least two manifolds to redistribute the gas flow to a second manifold of said at least two manifolds upon the determination that the at least one manifold of said at least two manifolds is fouled.

9. The wind turbine according to claim 8, wherein said at least one rotor blade comprises a first rotor blade and a second rotor blade, the first manifold defined within the first rotor blade and the second manifold defined within the second rotor blade.

10. The wind turbine according to claim 9, wherein said at least one rotor blade comprises a first rotor blade and a second rotor blade, said first rotor blade comprising a first plurality of manifolds and said second rotor blade comprising a second plurality of manifolds.

11. The wind turbine according to claim 10, further comprising a second gas supply, wherein said gas supply is in flow communication with said first plurality of manifolds and said second gas supply is in flow communication with said second plurality of manifolds.

12. The wind turbine according to claim 8, wherein said AFC controller is configured to operate said AFC system in an AFC mode and a cleaning mode, wherein a gas flow rate through one manifold of said at least two manifolds during the cleaning mode is higher than a gas flow rate through the one manifold of said at least two manifolds during the AFC mode.

13. The wind turbine according to claim 8, further comprising a second gas supply having a lower flow rate than a flow rate of said gas supply, said gas supply serving as a primary cleaning gas supply and said second gas supply serving as an AFC gas supply.

14. A method for cleaning at least one manifold of at least two manifolds at least partially defined within at least one rotor blade of a wind turbine having an active flow control (AFC) system, a gas supply in flow communication with the at least two manifolds, said method comprising:
operating the AFC system in a first mode;
determining whether a first manifold of the at least two manifolds is to be cleaned; and
operating the AFC system in a second mode different than the first mode upon determining that the first manifold is to be cleaned, a gas flow rate through the first manifold during the second mode being higher than a gas flow rate through the first manifold during the first mode.

15. The method according to claim 14, wherein operating the AFC system in a second mode comprises blocking a gas flow through a second manifold of the at least two manifolds to redistribute the gas flow to the unblocked first manifold.

16. The method according to claim 14, wherein operating the AFC system in a second mode comprises increasing a gas flow rate of the gas flow supplied from the gas supply to the first manifold.

17. The method according to claim 16, further comprising increasing the gas flow rate of the gas supply by connecting a second gas supply in series to the gas supply.

18. The method according to claim 14, wherein the wind turbine includes at least a first rotor blade and a second rotor blade, said method further comprising operating the first rotor blade in a mode different than a mode in which the second rotor blade is operated.

19. The method according to claim 14, wherein the wind turbine includes at least a first rotor blade and a second rotor blade, the first manifold defined in the first rotor blade and a second manifold of the at least two manifolds defined in the second rotor blade, and wherein operating the AFC system in a second mode comprises concentrating a gas flow through the first manifold and the second manifold on the same spanwise section of each of the first rotor blade and the second rotor blade.

20. The method according to claim 14, wherein the first manifold and a second manifold of the at least two manifolds are each in flow communication with the gas supply, said method further comprising:
supplying gas from the gas supply to the first manifold in the first mode; and
supplying gas from the gas supply to the second manifold in the second mode.

* * * * *